(No Model.)

L. W. MERRIAM.
BUTTER OR CHEESE CUTTER.

No. 559,494. Patented May 5, 1896.

Attest:
Edw. T. Duvall Jr.
B. C. Tiffany

Inventor:
Lyman W. Merriam
per Fred E. Tasker,
Atty.

UNITED STATES PATENT OFFICE.

LYMAN W. MERRIAM, OF FITCHBURG, MASSACHUSETTS, ASSIGNOR OF ONE-HALF TO GEORGE O. ALLEN, OF SAME PLACE.

BUTTER OR CHEESE CUTTER.

SPECIFICATION forming part of Letters Patent No. 559,494, dated May 5, 1896.

Application filed November 20, 1894. Serial No. 529,392. (No model.)

*To all whom it may concern:*

Be it known that I, LYMAN W. MERRIAM, a citizen of the United States, residing at Fitchburg, in the county of Worcester and State of Massachusetts, have invented certain new and useful Improvements in Butter or Cheese Cutters; and I do hereby declare the following to be a full, clear, and exact description of the invention, such as will enable others skilled in the art to which it appertains to make and use the same.

My present invention has reference to an improved butter and cheese cutter, the object being to provide a simple, cheap, and efficient means of cutting or dividing quantities of butter, cheese, and similar substances into parts of such size as may be requisite and desirable, the said improved means being especially of such a character that the bulk of butter or cheese may be thereby held firm and immovable and effectually prevented from slipping in addition to being properly severed into the desired parts as the result of the deft manipulation of my improved instrument by its user; and the invention consists in the construction, arrangement, and combination of parts, substantially as will be hereinafter described and claimed.

Figure 1:
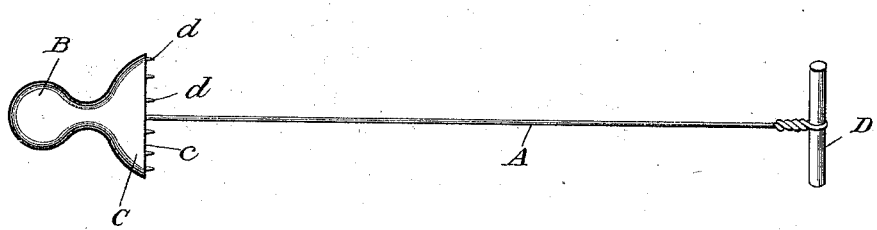
Figure 2:
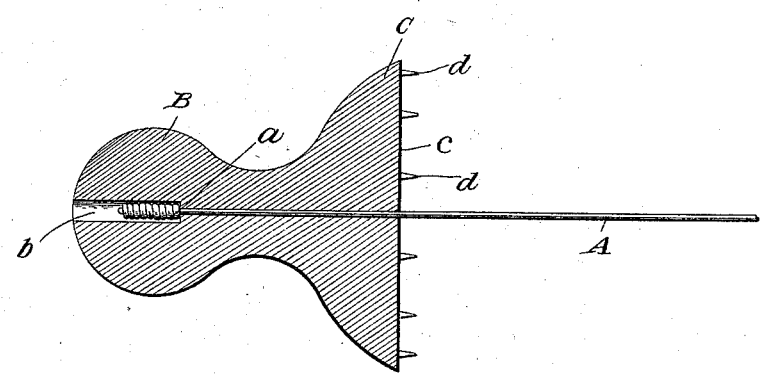
Figure 3:
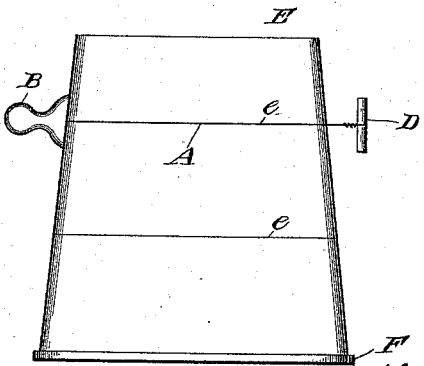

In the annexed drawings, illustrating my invention, Figure 1 is a side elevation of my improved butter and cheese cutter. Fig. 2 is an enlarged sectional detail view of the handle and shows the cutter-wire attached thereto. Fig. 3 represents a mass of butter or cheese to which my improved device is being applied to sever it into three parts, for instance, as shown.

Like letters of reference denote like parts in all the different figures.

Suppose, for example, that E denotes a quantity of butter that has been removed from a tub or firkin and superposed in a reversed position upon the tub-cover F, as shown in Fig. 3. Now in order to cut a pound or other desired quantity from the bulk E it becomes necessary to provide some sort of an instrument for the purpose, and the retailer or other dealer commonly employs simply a length of wire having handles at its ends. Such a device, however, is very unsatisfactory, because a mass of butter like that shown at E is apt to slide about or tip over when the cutter-wire is applied to the side of the mass and pressed laterally thereinto, and consequently when a crude implement of the kind alluded to is used it becomes necessary to hold the butter or cheese with the hand to keep it from slipping, and as a result finger-marks are imprinted upon the butter or it is otherwise damaged. In order to obviate this trouble, I provide my device by means of which the butter not only can be cut, but also will be held in place while the operation of cutting is in progress.

A denotes the cutter-wire, the same being any ordinary wire of suitable size.

B denotes a neatly-shaped handle, having, preferably, a rounded form and provided with a flange C, having a face $c$, that is adapted to come into contact with the butter or cheese, as shown in Fig. 3. The handle B is provided with an axial passage through which the wire A passes, said passage being enlarged at one end, as shown in Fig. 2, to provide the recess $b$ to contain the twisted end $a$ of the wire A. The wire is arranged in this way, so that it may not be readily detached from the handle.

The other end of the wire A is provided with a handle consisting of a short round rod D, (see Figs. 1 and 3,) the wire being attached thereto by twisting it about the handle or otherwise fastening it thereto.

The face $c$ of the flange C will generally be plain if the cutting device is to be used only with butter; but when it is intended for use with cheese this face $c$ will preferably be provided with teeth or spurs $d$, that will enter the cheese and hold the handle firm. Of course the flanged handle B may be made in a variety of different forms. It is preferably turned out of wood.

In practice the handle B will be placed, as shown in Fig. 3, with its flange C against the side of the butter or cheese, and then by pulling the wire with the handle D through the butter on the lines $e\,e$ or at other points the butter may be cut as desired and will be firmly held without placing the hand against it.

Having thus described my invention, what I claim as new, and desire to secure by Letters Patent, is—

The herein-described butter and cheese cutter, which consists in the combination with a disk having a flat face on one side and a handle on the other side, of a cutting-wire attached centrally to the flat face of the disk and provided at its other end with a transverse handle, substantially as described.

In testimony whereof I affix my signature in presence of two witnesses.

LYMAN W. MERRIAM.

Witnesses:
 MARTIN S. HALL,
 F. A. CURRIER.